May 7, 1935.  V. E. SCHMIEDEKNECHT  2,000,791
BATHTUB AND SHOWER CONTROL VALVE
Filed Nov. 23, 1934  3 Sheets-Sheet 1
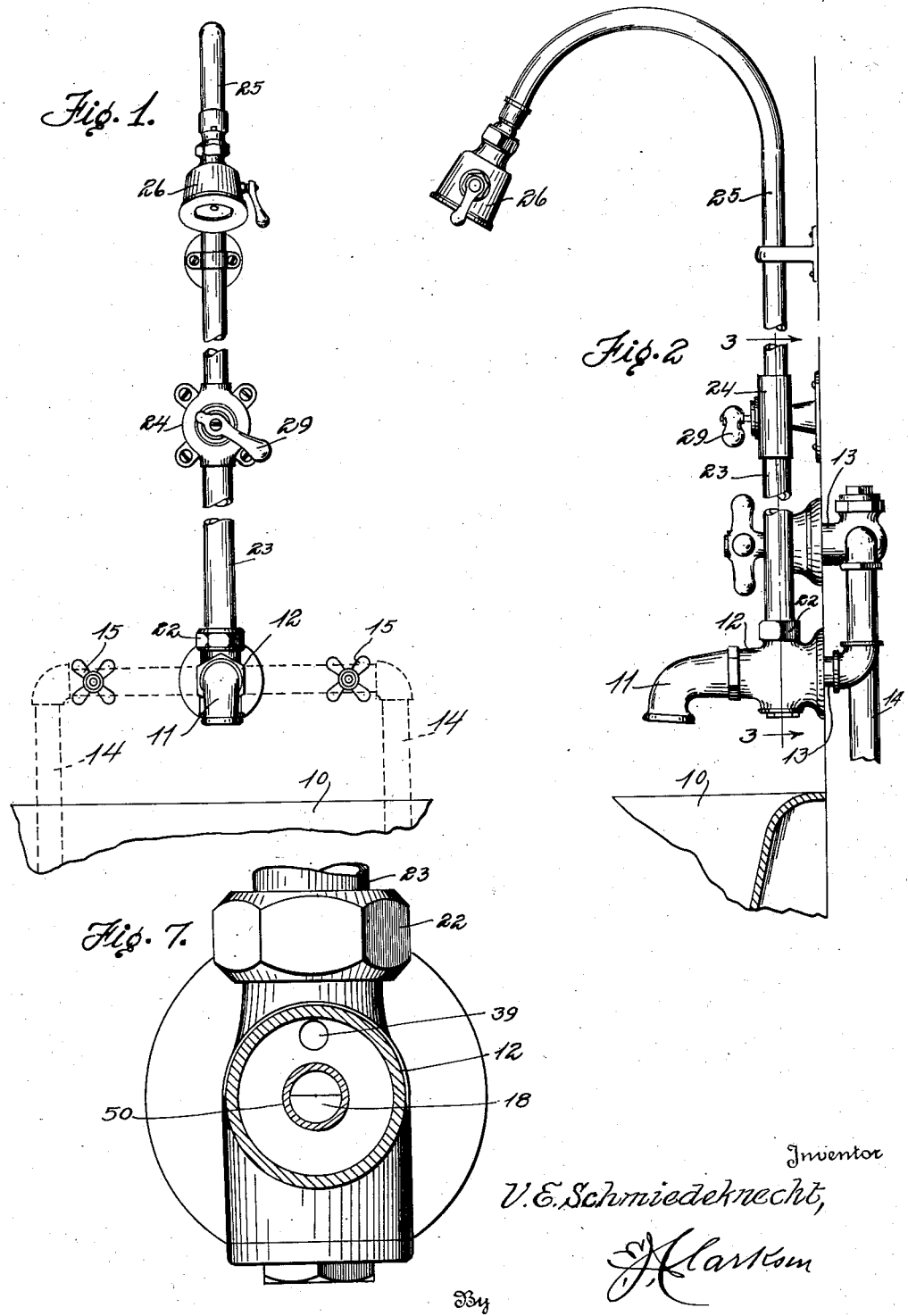
Inventor
V. E. Schmiedeknecht,
By  ﾠHCarlson
Attorney

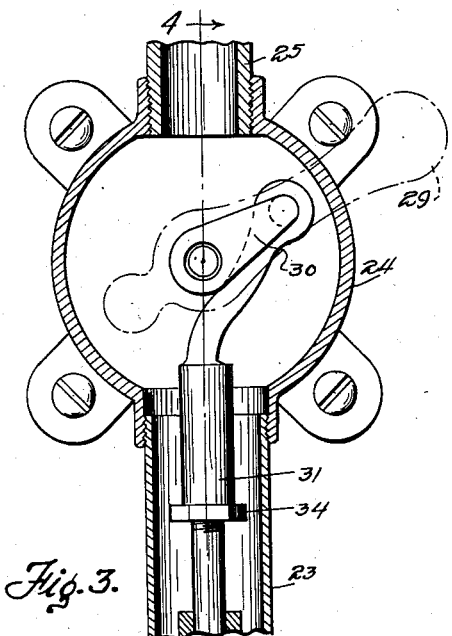
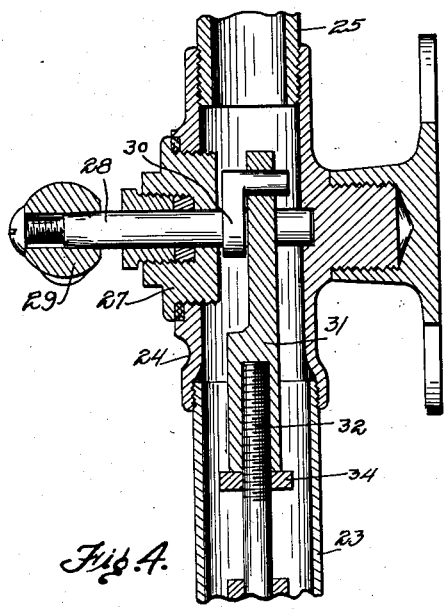
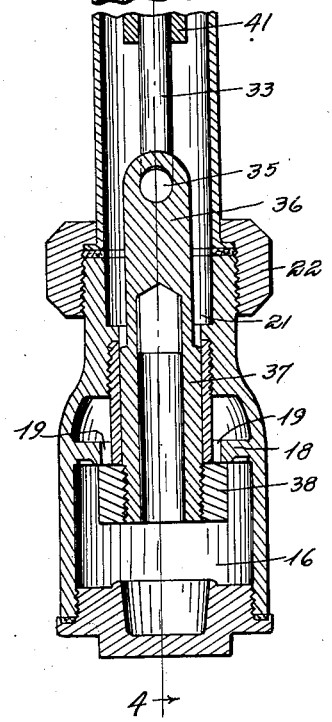
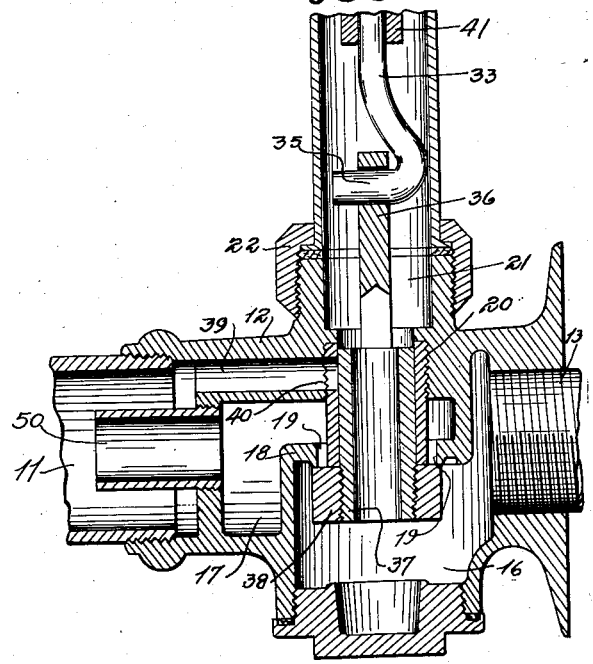

May 7, 1935.     V. E. SCHMIEDEKNECHT     2,000,791
BATHTUB AND SHOWER CONTROL VALVE
Filed Nov. 23, 1934     3 Sheets-Sheet 3
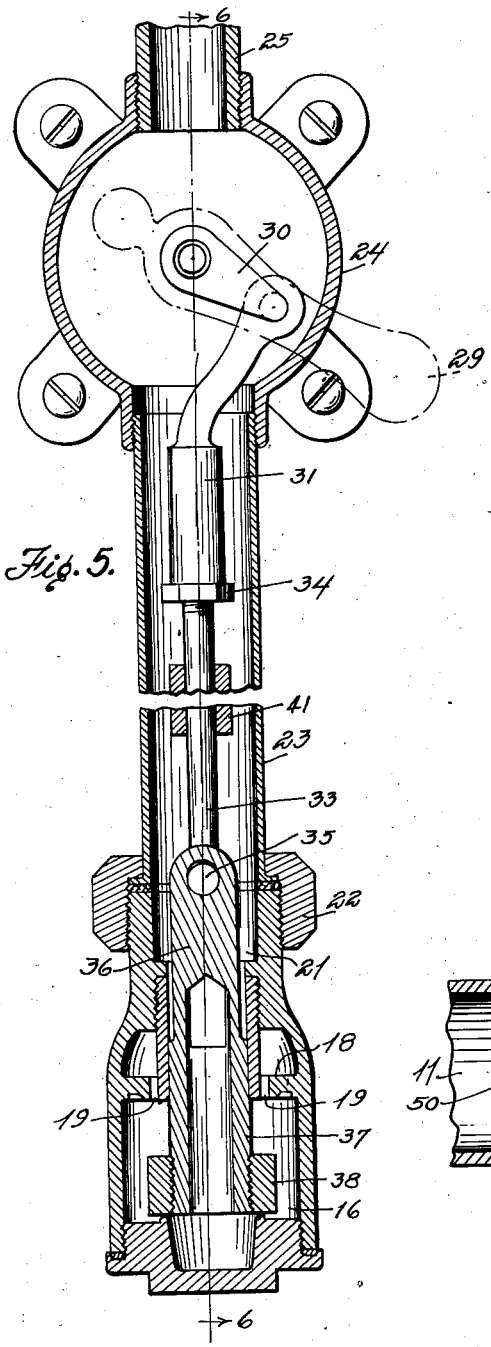
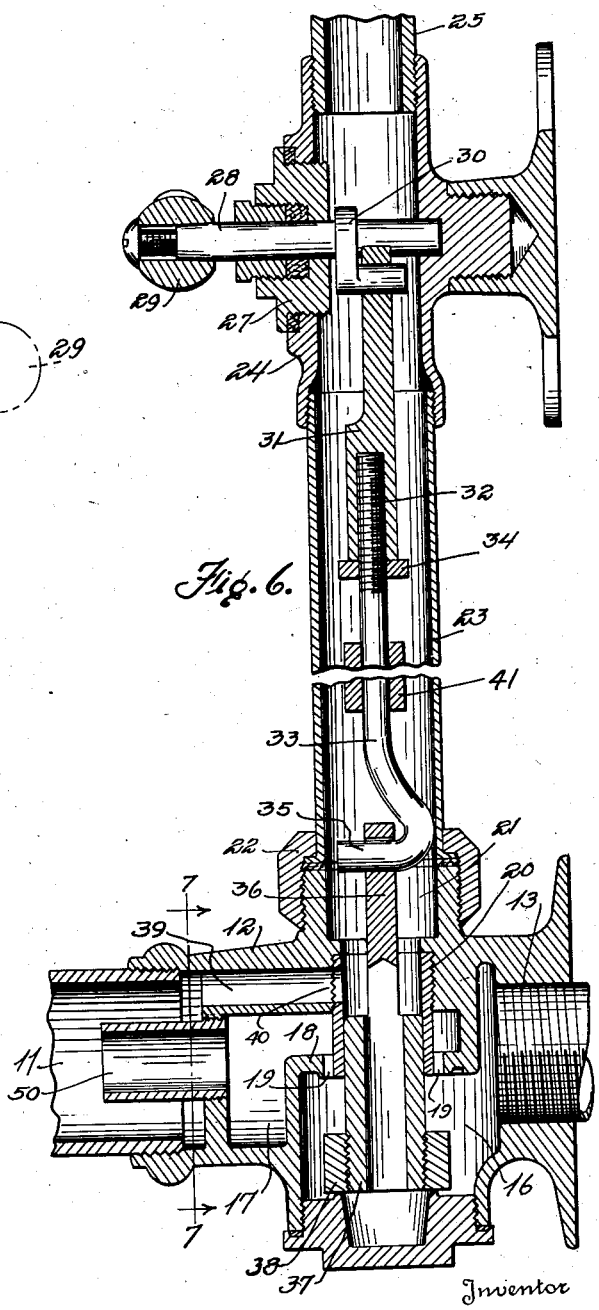
Inventor
V. E. Schmiedeknecht,
By 
Attorney Patented May 7, 1935

2,000,791

UNITED STATES PATENT OFFICE 2,000,791

BATHTUB AND SHOWER CONTROL VALVE

Victor E. Schmiedeknecht, Louisville, Ky.

Application November 23, 1934, Serial No. 754,506

9 Claims. (Cl. 277—13)

This invention relates to bath apparatus and has special reference to a valve for controlling a combined bathtub supply faucet and sprinkler head.

In the usual forms of fittings and valve arrangements used in connecting the water supply faucets of a bathtub and the water controls for a shower fixture when the latter is used in connection with a bathtub, it is necessary to have four or five valves in order that the tub can be filled independently of the shower supply or vice versa. It is, therefore sometimes confusing to an individual using the fixtures and there is also an element of danger of scalding with hot water in the event that the valves are not reset to their initial positions after a bather has used same. For example, the assemblage of the valves often require the valve leading to the shower head to be opened while being used; however, it is possible to close off the water supply by the use of the main supply valves; therefore, in the event that this valve supplying the shower is not manually closed, a second person using the bath may unexpectedly receive water from the shower in his intention to fill the tub for example.

One important object of the invention is to provide valve means whereby the supply to the shower head is controlled by a simple motion of a valve handle.

A second important object of the invention is to provide a valve arrangement including hot and cold water supply valves and a third valve controlling flow to a sprinkler head wherein, upon closing the hot and cold water supply valves the third valve will automatically close off supply to the sprinkler head.

A third important object of the invention is to provide means whereby, upon closing of the hot and cold water supply valves, the valve controlling the sprinkler head will automatically close and effect drainage of the pipe leading to the sprinkler head.

A fourth important object of the invention is to provide a novel valve arrangement for devices of this character wherein the usual multiplicity of control valves is eliminated.

With the above and other objects in view, as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is an end view of the piping and valve arrangement as constructed in accordance with this invention.

Figure 2 is a side view thereof.

Figure 3 is an enlarged detail section on the line 3—3 of Figure 2 and showing the shower controlling valve in position to permit flow of water to the shower.

Figure 4 is a section on the line 4—4 of Figure 3;

Figure 5 is a section similar to Figure 3 but showing the valve for controlling the flow of water to the sprinkler or shower head in position to close off such flow.

Figure 6 is a view similar to Figure 4 but also showing the valve in position to close off flow to the sprinkler or shower head.

Figure 7 is an enlarged section on the line 7—7 of Figure 6.

In the embodiment of the invention herein illustrated there is shown a portion of a bathtub 10, the water supply to which flows through a faucet 11, which is connected to a valve chamber 12 receiving supply from a pipe 13, which is fed from hot and cold water supply pipes 14 each controlled by a valve 15. The valve chamber or body 12 is provided between its inlet side 16 and its outlet side 17 with a partition 18 having an opening or passage 19 therein. This valve body furthermore has a tubular member 20 screwed therein so that its lower end is flush with the bottom of the partition 18. The upper end of the tubular member 20 communicates with a vertical outlet 21 whereto is connected, by a union 22, a vertical pipe 23 connected at its upper end to a nipple 24 above which extends a gooseneck 25 carrying at its free extremity a spray head 26, which is preferably of the type shown in my copending application for patent filed November 23, 1934 and bearing the Serial Number 754,507.

It will be seen that a suction tube 50 extends into the outlet 17 from the chamber 17 to provide better suction when emptying the vertical tube 23.

Arranged in the nipple 24 is a packing gland 27 through which passes a shaft 28 carrying on its end, which projects outwardly to the tub, an operating handle 29. Fixed on the shaft 28 within the nipple 24 is a crank 30 whereto is connected a link 31 having a hollow and internally threaded lower end wherein is screwed the threaded end 32 of a link extension 33. A lock nut 34 serves to lock the threaded portion 32 to the link member 31. The lower end of the link 33 is bent to extend transversely of the pipe 23 as at 35 and this lower end passes through the upper end of a yoke 36 formed on a tubular member 37 slidingly fitted in the member 20. On the lower end of the member 37 is screwed a valve member 38. In addition to the outlet 17 of the valve body 12 there is provided a secondary outlet 39 which communicates through a port 40 formed in the side wall of the member 20 with the vertical outlet of the valve body 12.

In the operation of the device we may suppose that the bather desires to fill the bathtub. The normal position of the shower controlling parts is that shown in Figures 5 and 6. In order to fill the bathtub it is merely necessary for the bather to open the valves 15 to produce such a mixture of hot and cold water as he desires. In that case the water enters through the inlet 16, flows up through the passage 19, this being an annular passage surrounding the member 20, and passes out through the outlet 17 to the faucet 11 and thus into the tub. If the bather desires to use the shower he turns the handle 29 from the position shown in Figure 5 to the position shown in Figure 3 and thereupon lifts the valve member 38 so that it closes the annular passage 19, while at the same time this lifting also closes the port 40 and opens the lower end of the tubular member 37 to the flow of water from the inlet 16. Thereupon water will flow from this inlet 16 up through the tubular member 37, the pipe 23, the nipple 24, the gooseneck 25, and out through the sprinkler head 26. It is always customary, after a bath has been taken, to turn off the hot and cold water and in the present apparatus whenever the valves 15 are closed the member 37 will drop to the position shown in Figure 6, the link 33 being, if desired, provided with a weight 41 to effect this dropping. This is because the crank 30 turns only through about 90 degrees so that it will readily pull down whenever the pressure is cut off below the valve 38, being held up against the action of gravity by the pressure of the water in the chamber 16 until the valves 15 are closed. Thus, whenever the valves 15 are closed the parts automatically assume the position shown in Figure 6 and when the valves 15 are next opened water will flow simply into the tub and not through the shower head.

Furthermore, it will be noted from Figure 6 that when the member 37 has dropped the port 40 is opened. Therefore, any water which remains in the pipe leading to the sprinkler head will either flow out through that head or flow down through the port 40 and passage 39 and thus into the tub. When the water is being run to the tub under high pressure the arrangement of the passage 39 relative to the internal outlet nozzle 50 creates a suction in passage 39 which draws out any accumulated water in riser pipe 23 which may have been forced between the sliding member 37 and its surrounding tubular member 20.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In a bath apparatus including a tub faucet and a shower head, a valve casing having an inlet and an outlet communicating with said faucet and a second outlet communicating with said shower head, said valve casing having an outlet passage in said casing opening directly from the second outlet to the first outlet, and a single valve means in said casing movable between a position to place said inlet into communication with the outlet to said faucet and a position to place said inlet in communication with said shower head, said valve means being arranged to open said passage when in the first position and to close the same when in the second position.

2. In a bath apparatus including a tub faucet and a shower head, a valve casing having an inlet and an outlet communicating with said faucet and a second outlet communicating with said shower head, said valve casing having an outlet passage in said casing opening directly from the second outlet to the first outlet, a single valve means in said casing movable between a position to place said inlet into communication with the outlet to said faucet and a position to place said inlet in communication with said shower head, said valve means being arranged to open said passage when in the first position and to close the same when in the second position, pipe means leading from said shower head to said second outlet, and a control member intermediate the ends of said pipe means and operatively connected to said valve means to move the same to selective positions.

3. In a bath apparatus including a tub faucet and a shower head, a valve casing having an inlet and an outlet communicating with said faucet and a second outlet communicating with said shower head, said valve casing having an outlet passage in said casing opening directly from the second outlet to the first outlet, a single valve means in said casing movable between a position to place said inlet into communication with the outlet to said faucet and a position to place said inlet in communication with said shower head, said valve means being arranged to open said passage when in the first position and to close the same when in the second position, hot and cold water supply pipes connected to said inlet, and supply valves each controlling the supply of water through a respective supply means.

4. In a bath apparatus including a tub faucet and a shower head, a valve casing having an inlet and an outlet communicating with said faucet and a second outlet communicating with said shower head, said valve casing having a passage opening between said outlets, a single valve means in said casing movable between a position to place said inlet into communication with the outlet to said faucet and a position to place said inlet in communication with said shower head, said valve means being arranged to open said passage when in the first position and to close the same when in the second position, pipe means leading from said shower head to said second outlet, a control member intermediate the ends of said pipe means and operatively connected to said valve means to move the same to selective positions, and means associated with said control member for automatically effecting closure of the communication between the said inlet and shower head upon closing of said supply valves.

5. In a bath apparatus including a tub faucet and a shower head, a valve casing having an inlet and an outlet communicating with said faucet and a second outlet communicating with said shower head, said valve casing having a passage opening between said outlets, a single valve means in said casing movable between a position to place said inlet into communication with the outlet to said faucet and a position to place said inlet in communication with said shower head, said valve means being arranged to open said passage when in the first position and to close the same when in the second position, hot and cold water supply pipes connected to said inlet, supply valves each controlling the supply of water through a respective supply means, and means associated with said control member for automatically effecting closure of the communication between the said inlet and shower head upon closing of said supply valves.

6. In a valve structure for the purpose described, a valve body having a ported diaphragm dividing the interior of the body into upper and lower chambers, a tubular valve of less diameter than the diaphragm port and slidable therethrough, a guide for said valve having an outlet at its upper end adapted to be connected to an outlet pipe, a second outlet port opening from the upper chamber, an inlet port opening into the lower chamber, a collar on the lower end of the valve adapted to seat on the bottom of the lower chamber in normal position of the valve to close the passage to the first outlet port and to seat beneath the diaphragm in a second position to close the diaphragm port, and means to operate said valve.

7. In a valve structure for the purpose described, a valve body having a ported diaphragm dividing the interior of the body into upper and lower chambers, a tubular valve of less diameter than the diaphragm port and slidable therethrough, a guide for said valve having an outlet at its upper end adapted to be connected to an outlet pipe, a second outlet port opening from the upper chamber, an inlet port opening into the lower chamber, a collar on the lower end of the valve adapted to seat on the bottom of the lower chamber in normal position of the valve to close the passage to the first outlet port and to seat beneath the diaphragm in a second position to close the diaphragm port, a passage leading from the interior of the valve guide to the second outlet port, said passage being open in normal position of the valve and closed in said second valve position, and means to operate said valve.

8. In a valve structure for the purpose described, a valve body having a ported diaphragm dividing the interior of the body into upper and lower chambers, a tubular valve of less diameter than the diaphragm port and slidable therethrough, a guide for said valve having an outlet at its upper end adapted to be connected to an outlet pipe, a second outlet port opening from the upper chamber, an inlet port opening into the lower chamber, a collar on the lower end of the valve adapted to seat on the bottom of the lower chamber in normal position of the valve to close the passage to the first outlet port and to seat beneath the diaphragm in a second position to close the diaphragm port, a pipe leading upwardly from the first outlet port, a crank shaft extending into the interior of said pipe and having a crank on its inner end and an operating handle on its outer end, and a link connecting said valve and crank.

9. In a valve structure for the purpose described, a valve body having a ported diaphragm dividing the interior of the body into upper and lower chambers, a tubular valve of less diameter than the diaphragm port and slidable therethrough, a guide for said valve having an outlet at its upper end adapted to be connected to an outlet pipe, a second outlet port opening from the upper chamber, an inlet port opening into the lower chamber, a collar on the lower end of the valve adapted to seat on the bottom of the lower chamber in normal position of the valve to close the passage to the first outlet port and to seat beneath the diaphragm in a second position to close the diaphragm port, a passage leading from the interior of the valve guide to the second outlet port, said passage being open in normal position of the valve and closed in said second valve position, a pipe leading upwardly from the first outlet port, a crank shaft extending into the interior of said pipe and having a crank on its inner end and an operating handle on its outer end, and a link connecting said valve and crank.

VICTOR E. SCHMIEDEKNECHT.